C. A. FARGO.
Wagon-Brake
No. 69,553.
Patented Oct. 8, 1867.
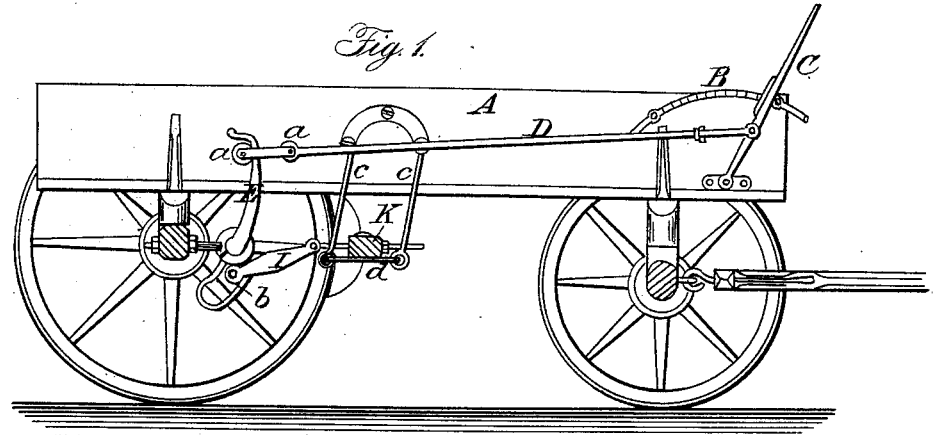
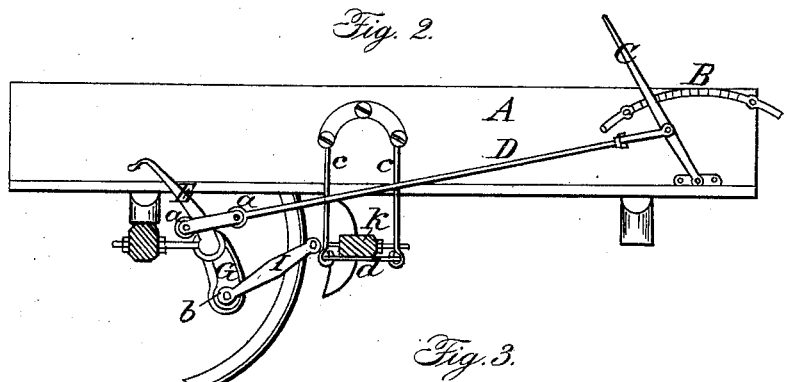
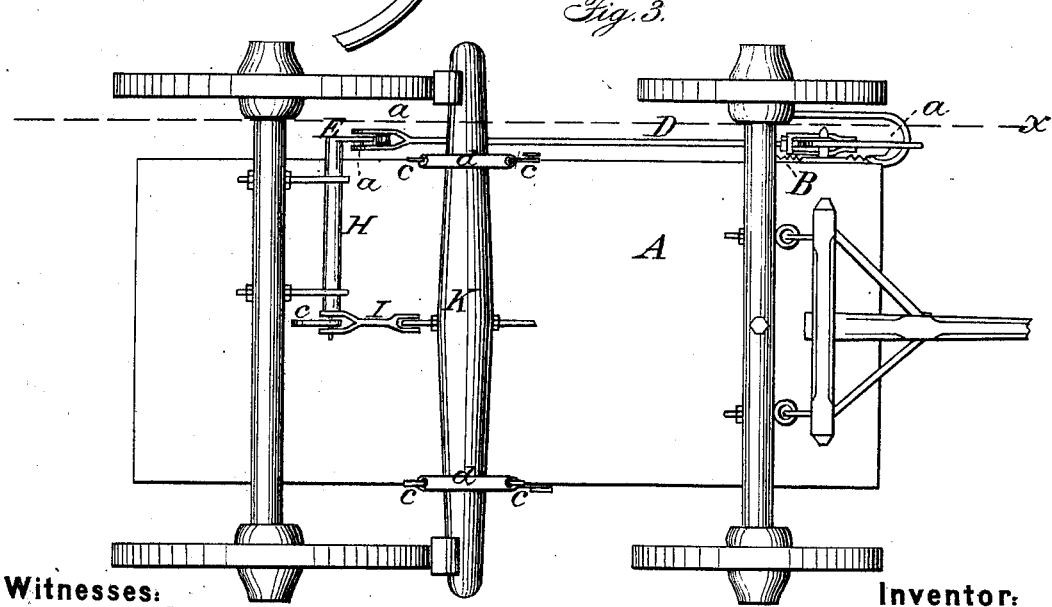
Witnesses:
Inventor:

United States Patent Office.

CORYDON ALONZO FARGO, OF SOQUEL, CALIFORNIA.

Letters Patent No. 69,553, dated October 8, 1867.

IMPROVEMENT IN WAGON-BRAKE.

*The Schedule referred to in these Letters Patent and making part of the same.*

---

TO ALL WHOM IT MAY CONCERN:

Be it known that I, CORYDON ALONZO FARGO, of Soquel, county of Santa Cruz, State of California, have invented a new and useful "Wagon-Brake;" and I do hereby declare the following description and accompanying drawings are sufficient to enable any person skilled in the art or science to which it most nearly appertains to make and use my said invention or improvement, without further invention or experiment.

My invention relates to "wagon-brakes," and consists in making them in such a manner that a great increase of power and efficiency is attained without lengthening the lever or complicating the mechanism, while at the same time the brake may be moved to such a distance from the wheel, when not in use, as to entirely avoid clogging and consequent friction in muddy weather. It also consists in so suspending the brake from the body of the wagon that it is in the same relative position to the wheel, whether close to it or removed to its greatest distance. To effect this the brake is made with a lever within convenient reach of the driver, and a connecting-rod reaching to the arm which rotates the shaft and short lever under the wagon, which in turn actuates the brake-bar, extending entirely across the body of the wagon, and having a brake-block on each end to operate upon the hind wheels of the wagon, when desired. The connecting-rod has a variable attachment to the rotating arm to increase the leverage, while the short lever, operating directly upon the brake-bar, has a cam-like or eccentric motion, greatly increasing the power of the lever as the blocks are pressed harder against the wheels. When the brake is not in use the levers by their variable action throw it to a greater distance from the wheel than any ordinary levers can do. The brake bar is suspended from the wagon body by a system of rods, so that it keeps its parallel motion as it moves, and all parts of the block are equally distant from the wheel.

To more fully explain my invention reference is had to the accompanying drawings, forming part of this specification, of which—

Figure 1 is a side elevation, with section of axles through $x\ x$.

Figure 2 shows the brake thrown off.

Figure 3 is a bottom view of wagon and brake.

A is the wagon body, having attached to its front end the ratchet B, which holds the lever C in any desired position. D is a connecting-rod, one end being attached to the lever C, and the other to the arm E. The arm E is slightly curved backward, and the connecting-rod is forked at the end, having between its sides two friction-rollers $a\ a$, one of which moves on each side of the arm E, so that as the arm is drawn forward the rod D moves nearer the top, thereby increasing the leverage. The lever or link G is attached to the shaft H beneath the floor of the wagon, and forms a cam. The short connecting-rod I is attached at one end to the centre of the brake-bar, and has a friction-roller, $b$, at its other, which moves inside the link or cam G. The brake-bar K is suspended from the sides of the wagon by the rods $c\ c$, and the cross-bar $d$ is attached by joints or otherwise to their lower ends. This forms a parallel motion, so that the brake-bar keeps the same position, whether near to or at a distance from the wheels.

When the lever C is thrown back the brake-blocks are at a distance from the wheel, as shown in fig. 2, so that they will not become clogged with mud or dirt, and so increase the labor of drawing the wagon, and this benefit is materially increased by all parts of the blocks being equally distant.

When it is necessary to use the brake it is brought into contact with the wheels by moving the lever C forward, the connecting-rods D and I remaining at the bottom of their respective levers E and G, so that no motion is lost in moving the brake-block into contact with the wheel. As soon as the pressure is increased the friction-rollers $a\ a$ and rod D move up on the arm E, so that the leverage is constantly increased. The end of the rod I also moves up as the link G is rotated, till at last it will be brought into contact with the shaft H. By these variable connections the long arm of the lever E is made much longer, while the short arm G is shortened, thus giving the greatest possible power when needed. These relations are changed to the opposite when the lever C is again moved back, so that there will be no great loss of motion in throwing the brake-blocks to the necessary distance from the wheel.

Having thus described my invention, what I claim, and desire to secure by Letters Patent, is—

1. A brake, constructed with the arm E and link G, together with the connecting-rods D and I, having a variable connection with E and G respectively, or their equivalents, operating substantially as and for the purpose herein described.

2. The vibrating suspending arms $c\ c$ and the cross-bar $d$, attached to the bar K for producing parallel motion, substantially as herein described.

In witness whereof I have hereunto set my hand and seal.

C. A. FARGO. [L. S.]

Witnesses:
   C. W. M. SMITH,
   GEO. H. STRONG.